Dec. 8, 1959 C. W. WILSON 2,916,500
METHOD OF PURIFYING FLAVONE DERIVATIVES
Filed Aug. 27, 1953
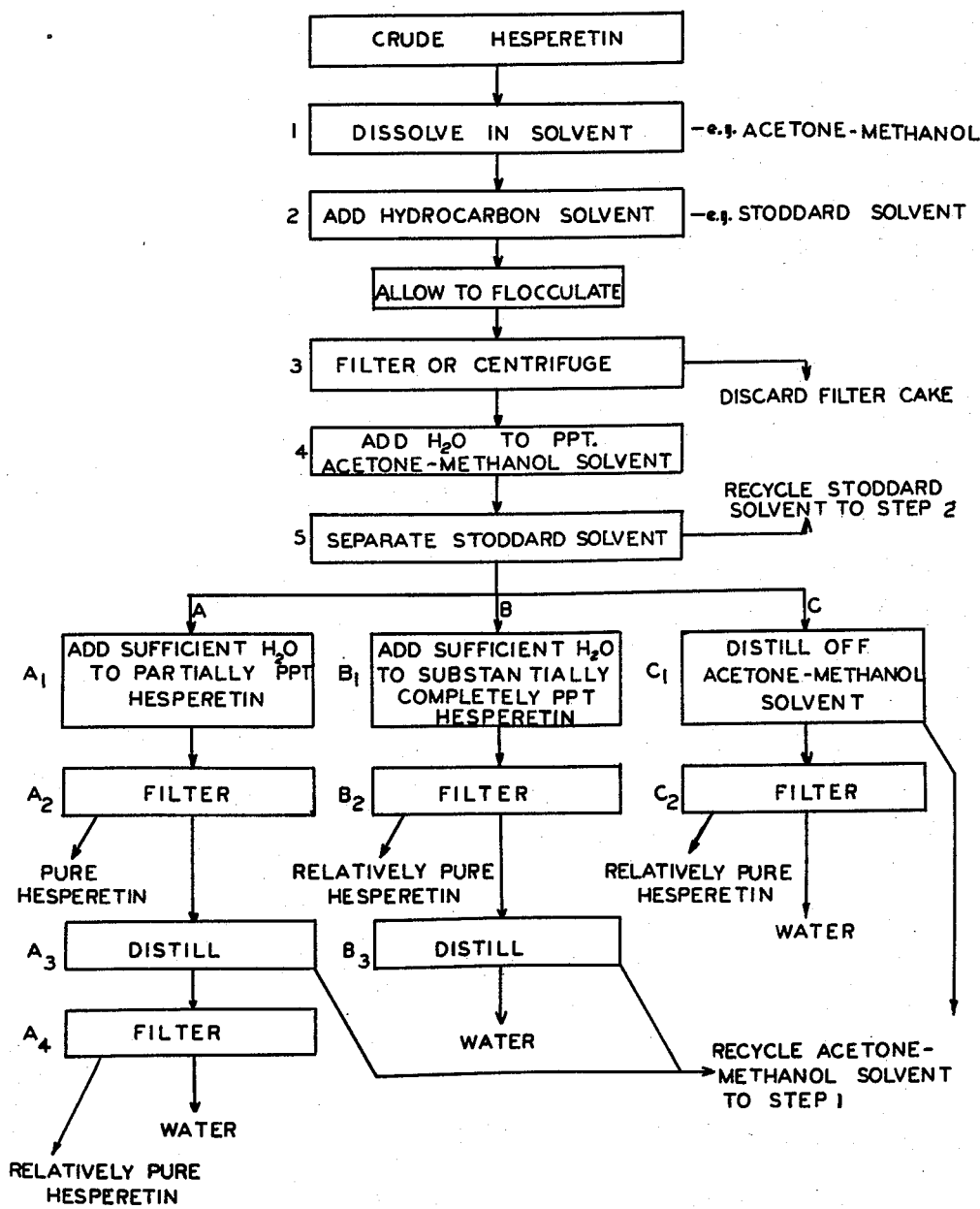
CLARENCE WALTER WILSON
INVENTOR.

United States Patent Office 2,916,500
Patented Dec. 8, 1959

2,916,500

METHOD OF PURIFYING FLAVONE DERIVATIVES

Clarence Walter Wilson, Ontario, Calif., assignor to Sunkist Growers, Inc., Los Angeles, Calif., a corporation of California Application August 27, 1953, Serial No. 376,951

13 Claims. (Cl. 260—345.2)

This invention relates to methods for purifying crude compounds belonging to the flavone family. More particularly, the invention relates to the purification of aglycones of flavones and flavanones, respectively. The method is particularly useful in the purification of hesperetin. The method comprises broadly, dissolving the crude flavone derivative in a solvent for both the impurities and the flavone, adding a second and different solvent which will cause precipitation of a major proportion of the impurities, separating the impurities, and adding water to the residual solvent solution to insolubilize and recover the flavone and the second solvent.

In my copending application Serial No. 232,013, filed June 16, 1951, and now issued as Patent No. 2,700,047, I have disclosed a method for obtaining hesperetin by an exclusively aqueous phase hydrolysis of hesperidin. The product obtained by this process, especially if a crude hesperidin was used as the raw material, is found to contain some varnish-like impurities which are very difficult to separate efficiently from the hesperetin. These varnish-like materials are of unknown chemical composition and may impart to the product a dark amber color, as well as cause crystallization difficulties.

Hesperetin prepared by other methods, such as for example, that disclosed by Tieman and Will, Ber. 14 (1881), 946–974, have also been found to contain similar impurities. The method for purification disclosed by Tieman and Will is expensive and difficult to control adequately. It consists essentially in decolorizing the product by precipitating the impurities from an alcohol solution with lead acetate. The use of lead acetate involves an expensive recovery step, and moreover, the amount used must be carefully controlled, inasmuch as any excess over the amount required to precipitate impurities will form an insoluble precipitate with the hesperetin which will come down with the precipitated contaminants. In commercial production it is very difficult to exercise adequate control over the amount of lead acetate required, since the amount of impurities may vary considerably.

Simple solvent extraction procedures, recrystallization from various solvents, and chemical treatments such as dissolving the crude material in aqueous alkali and reprecipitating with acid, are all found to give inefficient separation of impurities; considerable flavone derivative remains in the separated impurities and considerable impurities remain in the flavone derivative.

The principal object of my invention is to provide an economical and efficient method for the separation of impurities from the aglycones of the flavone derivatives.

A more particular object of the invention is to provide a method for the purification of crude hesperetin.

Another object is to provide a process which may be easily regulated and controlled under commercial operating conditions.

A still further object is to provide efficient measures for the recovery of solvents and reagents used in the purifying process.

Other objects and advantages will appear from the more detailed description which follows. Briefly, these objects are attained according to this invention by (1) dissolving crude hesperetin in a ketone solvent, (2) adding hydrocarbon solvent to the solution to precipitate impurities which are then removed, (3) separating the hydrocarbon from the ketone solution and (4) recovering hesperetin from the ketone solution.

In order to better illustrate my invention I recite hereinbelow a specific preferred procedure for purifying crude hesperetin with particular reference to the accompanying flow sheet.

*Example*

135 grams of a dark tan colored crude hesperetin, containing approximately 75% hesperetin, was obtained by aqueous acid hydrolysis of a crude hesperidin in accordance with the process of my aforementioned copending application Serial No. 232,013. This crude material is added to a mixture consisting of 350 milliliters of acetone and 150 milliliters of methanol (step 1). The mixture is agitated at room temperature until the crude hesperetin is completely dissolved. To this solution is then added 250 milliliters of Stoddard solvent (step 2), and the mixture is allowed to stand for about 10 minutes, whereupon a voluminous, dark colored, flocculent precipitate is formed. The mixture is then filtered (step 3) and the dark brown filter cake containing most of the impurities is discarded.

The filtrate is then treated to recover the Stoddard solvent by adding thereto about 200 milliliters of water (step 4). The water is thoroughly admixed with the solution, and the whole is allowed to stand for a sufficient length of time for the Stoddard solvent to rise to the surface and the lower layer to become entirely clear. This requires about 2 to 3 minutes per centimeter depth of liquid. The Stoddard solvent is then separated by decantation (step 5).

After removal of the Stoddard solvent, the residual solvent layer is treated by the addition of about 400 milliliters of water (step $A_1$). The mixture is allowed to stand for about 1 hour to allow crystallization of hesperetin and then filtered (step $A_2$). The filter cake consists of about 70 grams of light cream-colored hesperetin of a purity above 95% when dried. The filtrate consists primarily of solvent, water and a residual quantity of dissolved hesperetin of intermediate purity. This mixture is then transferred to a still, where the acetone-methanol solvent is distilled off (step $A_3$) and preferably recycled to step 1. The still residue then consists of water and precipitated hesperetin, and the residual hesperetin is recovered by filtration (step $A_4$). This residual hesperetin is less pure than that obtained from step $A_2$, and may therefore be recycled to step 1 for further purification if desired. It will be found that substantially all of the hesperetin is recovered, either in pure or relatively pure form, and only a negligible amount is lost at step 3.

The above example illustrates a preferred embodiment of my invention, and I now propose to elucidate upon various alternative procedures which may be employed at the various steps. Particular reference will be had to the accompanying flow sheet.

The aglycones of any flavone material which is soluble in a water soluble lower aliphatic ketone and which contains impurities also soluble in said ketone, but less soluble in a mixture of aliphatic hydrocarbons and water soluble ketones than the flavone material, may be purified by my process. Such impurities are usually present in aglycones which have been prepared by the aqueous hydrolysis of the parent flavone or flavanone glycoside, and the present invention is particularly directed to aglycones which have been prepared in that manner. Although reference will be made hereinafter to hesperetin, the process is equally useful in the purification of aglycones of the flavone derivatives in general and more particularly the aglycones of the flavanones and flavones. Materials aside from hesperetin which may fall in this class include flavanones such as naringinin (the aglycone of naringin) and flavones such as quercetin (the aglycone of quercitrin).

*Step 1.*—The solvent used for initially dissolving the crude hesperetin may be any water soluble, lower aliphatic ketone which is more soluble in water than in aliphatic hydrocarbons, and in which the hesperetin is soluble. The most eminently suitable ketone for this purpose is acetone, but others such as methyl-ethyl ketone are operative to a limited extent. In practice acetone is the preferred solvent, either alone or mixed with a lower aliphatic alcohol.

I have found that crude hesperetin is more soluble in an alcohol-ketone mixture than in the ketone alone, and a solvent containing from about 40 to 90% by volume of ketone and from about 10 to 60% by volume of a lower aliphatic water soluble alcohol is preferred. Suitable alcohols include for example, methanol, ethanol, propanol, isopropanol and tertiary butanol, methanol being the preferred alcohol. I prefer to use a mixture comprising about 70% acetone and about 30% methanol, but any proportion of alcohol which will increase the solubility of hesperetin in the ketone may be employed. When reference is made in the specification and claims to "ketone solvent," it is intended to include mixtures of alcohols and ketones, as well as ketones alone.

Aside from the solubility characteristics discussed above, the principal requirements for a suitable solvent or solvents are simply that they should preferably have a boiling point either distinctly above or distinctly below that of water, and that they preferably not form constant boiling mixtures with water. These requirements are to insure ease of separation of water and solvent by distillation in steps $A_3$, $B_3$ or $C_1$.

*Step 2.*—Propane and butane are examples of suitable hydrocarbons which may be employed if the step of separating impurities is to be performed under pressure. The lower aliphatic hydrocarbons as exemplified, for example, by petroleum ether are very efficient for my purpose, and are quite soluble in acetone alone, as well as in mixtures of acetone and the lower aliphatic alcohols in proportions that effectively dissolve hesperetin. However, petroleum ether presents a considerable explosion hazard, and hence, I may prefer to use hydrocarbons of higher average molecular weight as for example, Stoddard solvent which consists essentially of hydrocarbons boiling between about 300 to 400° F. Stoddard solvent is a well known petroleum hydrocarbon solvent whose properties are defined in the National Bureau of Standards Booklet entitled "Stoddard Solvent (Second Edition) Commercial Standard CS3–38." Kerosene contains hydrocarbons boiling up to about 570° F., and these higher members are not sufficiently soluble in the ketone-alcohol mixture to effect adequate removal of impurities. It has been found however, that even kerosene is suitable if it is mixed with approximately an equal volume of a low boiling hydrocarbon. For example, a mixture of equal volumes of kerosene and petroleum spirits is a suitable hydrocarbon solvent in applicant's process. In order to determine the suitability of a hydrocarbon, applicant has devised the following test: If a mixture of 1 volume of a hydrocarbon solvent is completely miscible with 4 volumes of methanol at a temperature of about 48° C. or less, the hydrocarbon solvent is suitable for use in the present process to precipitate impurities from the hesperetin solution.

I may in general employ any non aromatic hydrocarbon (or mixtures thereof) which is sufficiently soluble in the hesperetin solution to reasonably completely displace therefrom, the hesperetin impurities in insoluble form, without precipitating any appreciable amounts of hesperetin before clarification of the solution shall have been completed. To achieve this end, it is ordinarily required that the volume of hydrocarbon used should form at least about 20 to 25% by volume of the complete mixture. In the case of higher boiling hydrocarbons, such as Stoddard solvent for example, the hydrocarbon may be added in amounts up to about the limit of miscibility with the hesperetin solution and is usually less than 50% by volume of the total solvent mixture. When petroleum ether or other low boiling hydrocarbons are used, it is possible to add over 50% thereof to the hesperetin solution, the upper limit being in all cases the amount which begins to insolubilize the hesperetin or forms a second liquid phase, whichever occurs first. It is possible to add more hydrocarbon solvent after formation of a second liquid phase, but before precipitation of hesperetin. However, such further addition is not preferred as it hastens the precipitation of hesperetin and may cause some loss of hesperetin with the impurities. Precipitation of impurities is preferably carried out at room temperature although it is possible to perform step 2 at higher temperatures if desired. In every case the impurities will completely separate from the solvent mixture at a hydrocarbon solvent concentration which is less than the hydrocarbon concentration at which hesperetin will commence to crystallize. It is convenient therefore, to add the hydrocarbon gradually to the hesperetin solution until no further impurities separate out, and then separate the impurities according to step 3.

*Step 3.*—The precipitated impurities generally will form large flocs within a few minutes of addition of the hydrocarbon to the ketone solution and may then be separated from the solution by filtration, centrifuging or any other known method for separating insoluble solids from liquids. The filter cake obtained will contain a major part of the impurities originally present, and its hesperetin values are so low that it is ordinarily not necessary to rework it any further, unless it is desired to distill the residual solvent therefrom.

*Step 4.*—The clear solution from step 3 is treated preferably with only sufficient water initially to cause separation of the hydrocarbon solvent from the ketone-containing solution. This usually requires from about 10 to 25% by volume of water in the final mixture. It is preferred not to add sufficient water at this step to precipitate any appreciable amounts of hesperetin, although this may be done alternatively, as will be mentioned hereinafter.

*Step 5.*—The speed and completeness with which the hydrocarbon separates and forms a supernatant layer depends to some extent upon the amount of water used. However, when the supernatant layer is formed, it may be readily separated by well known means, for example by decantation, centrifuging, etc. If separation is by decantation, sufficient time should be allowed for the lower layer to become perfectly clear before the hydrocarbon is removed. As a practical matter, whatever the means of separation used, the aqueous ketone phase should be clear and free from emulsified hydrocarbon.

After removal of the hydrocarbon, the residual solution may be treated by any of three different recovery schemes as indicated at A, B and C in the flow sheet.

*Scheme A.*—In this preferred scheme, sufficient water is added at $A_1$ to only partially precipitate the hesperetin, preferably about 70% of the total contained in the solution. This may require the use of about twice as much water as was employed at step 4, but the amount may vary considerably, depending upon the concentration of the hesperetin solution.

After allowing time for the hesperetin to crystallize, the mixture is filtered (step $A_2$) by conventional methods. The filter cake is then washed and dried and will be found to contain hesperetin of usually above 95% purity. The filtrate from $A_2$ is then distilled at $A_3$ by generally known procedures and the solvent is received as condensate and returned to step 1. The solvent should be redistilled if necessary to render it substantially anhydrous before recycling it to step 1.

The still residue will be a mixture of water and hesperetin of intermediate purity. This mixture is filtered at step $A_4$ to recover the relatively pure hesperetin as a filter cake which may, if desired, be returned to step 1 for repurification.

This particular recovery scheme has the advantages of yielding a very pure product, while keeping the still charges down to a moderately small size.

*Scheme B.*—This recovery system is similar to scheme A except that substantially all the hesperetin is precipitated at step $B_1$ by adding larger quantities of water, perhaps 2 to 3 times the volume required for step $A_1$. The precipitated hesperetin is then filtered at step $B_2$ to give a relatively pure hesperetin filter cake and a solvent-water filtrate from which the solvent is recovered by distillation at step $B_3$. This scheme is a feasible alternative to A and C, but is not preferred since it results in large still charges at step $B_3$, and yields hesperetin of the same purity as may be obtained from recovery scheme C.

*Scheme C.*—If maximum purity of product is not the paramount objective, I prefer to pass the filtrate from step 5 immediately to a still to distill off the solvent mixture at step $C_1$. In this case, the still residue will consist essentially of a rather heavy slurry of water and hesperetin. This slurry is filtered at step $C_2$, and the filter cake consists of hesperetin of intermediate purity, which may be either used as such or repurified by a repetition of the process.

It will be seen that recovery scheme C has the advantage of small still charges, inasmuch as no further water is added to the mixture. It does not, however, furnish as pure a product as scheme A.

In the case of recovery schemes A and B, a major modification in the process may be desirable in some cases. This consists in the elimination of steps 4 and 5 from the flow sheet sequence, whereupon the addition of water at $A_1$ or $B_1$ will also simultaneously precipitate the hydrocarbon. In each case, the hydrocarbon will form a supernatant layer and the hesperetin will settle to the bottom, a process which may be accelerated by centrifuging. An additional step would then need to be interposed between $A_1$ and $A_2$ and between $B_1$ and $B_2$, consisting essentially in a hydrocarbon separation step, similar to displaced step 5. The desirability of this alternative sequence is largely a matter of choice.

Instead of first dissolving the crude hesperetin in a solvent and then precipitating impurities as in steps 1 and 2, I may alternatively first form a solvent-hydrocarbon mixture, and extract the crude hesperetin with this, whereupon the hesperetin dissolves and the impurities remain undissolved and are separated at step 3. This modification, while operative to a limited extent, is not preferred since the preformed solvent mixture will not dissolve as much hesperetin as may be maintained in solution by adding the hydrocarbon after the hesperetin is dissolved in the water-soluble solvents. In the latter case, a supersaturated or meta-stable solution is evidently formed.

It will be found that the pure product which I obtain from recovery scheme A is of sufficient purity for medicinal purposes. The products of intermediate purity from steps $A_4$, $B_2$ and $C_2$ are suitable for use as intermediate for azo dye-stuffs for example, or may be subjected to alkaline cleavage to produce isoferulic acid and phloroglucinol.

Having now described my invention in such full, clear and exact terms as to enable others skilled in the art to practice it, I do not desire to be limited to the precise details set forth in the specification, but only broadly as set forth in the following claims:

I claim:

1. A process for purifying crude aglycones of glycosides selected from the group consisting of flavone glycosides and flavanone glycosides which comprises dissolving said aglycone and precipitating the impurities therein in a miscible solvent mixture comprising (1) about 80 to 50% of a solvent selected from the group consisting of water soluble lower alkanones and mixtures thereof with up to about 60% by volume of a water soluble lower alkanol and (2) about 20 to 50% of a solvent selected from the group consisting of non aromatic hydrocarbons and mixtures thereof, said hydrocarbon solvent being characterized by being capable of forming a miscible mixture with methanol at a temperature not greater than about 48° C. where the miscible mixture contains 4 volumes of methanol for each volume of hydrocarbon solvent, separating said insoluble impurities and recovering the aglycone from the solvent mixture.

2. The process of claim 1 wherein the aglycone is hesperetin.

3. A process for purifying crude aglycones of glycosides selected from the group consisting of flavone and flavanone glycosides which comprises dissolving said aglycone and precipitating the impurities therein in a miscible solvent mixture comprising (1) about 80 to 50% of a solvent selected from the group consisting of acetone and mixtures thereof with up to about 60% by volume of a water soluble lower alkanol and (2) about 20 to 50% of Stoddard solvent, separating said insoluble impurities and recovering the aglycone from the solvent mixture.

4. A process for purifying crude aglycones of glycosides selected from the group consisting of flavone glycosides and flavanone glycosides which comprises dissolving said aglycone in a solvent selected from the group consisting of water soluble lower alkanones and mixtures thereof constaining up to about 60% by volume of a water soluble lower alkanol, adding to said solution about 20 to 50% of a solvent selected from the group consisting of non aromatic hydrocarbons and mixtures thereof, said hydrocarbon solvent being characterized by being capable of forming a miscible mixture with methanol at a temperature not greater than about 48° C., where said miscible mixture contains 4 volumes of methanol for each volume of hydrocarbon solvent, separating said insoluble impurities, adding water to said mixture to render the ketone solution which contains said aglycone dissolved therein insoluble in said hydrocarbon solvent whereby said hydrocarbon solvent separates out as a distinct phase, separating said hydrocarbon solvent and recovering the aglycone from the aqueous ketone mixture.

5. The process of claim 4 wherein the aglycone is hesperetin.

6. A process for purifying crude aglycones of glycosides selected from the group consisting of flavone glycosides and flavanone glycosides, which comprises dissolving said aglycone in a mixture comprising about 70% acetone and about 30% methanol, adding to said solution about 20 to 50% of a solvent selected from the group consisting of lower aliphatic hydrocarbons and mixtures thereof, said hydrocarbon solvent being characterized by being capable of forming a miscible mixture with methanol at a temperature not greater than about 48° C., where said miscible mixture contains 4 volumes of methanol for each volume of hydrocarbon solvent, separating said insoluble impurities, adding water to said mixture to render the acetone-methanol solution which contains said aglycone dissolved therein insoluble in said hydrocarbon solvent whereby said hydrocarbon solvent separates out as a distinct phase, separating said hydrocarbon solvent and recovering the aglycone from the aqueous acetone-methanol mixture.

7. The process of claim 4 wherein the non aromatic hydrocarbon solvent is mineral spirits.

8. The process of claim 4 wherein the non aromatic hydrocarbon solvent is Stoddard solvent.

9. A process for purifying crude hesperetin derived from the acid hydrolysis of hesperidin which comprises dissolving said crude hesperetin in a solvent selected from the group consisting of water soluble lower alkanones and mixtures thereof with up to about 60% by volume of a water soluble lower alkanol, adding to said solution about 20 to 50% of a solvent selected from the group consisting of non aromatic hydrocarbons and mixtures thereof, said hydrocarbon solvent being characterized by being capable of forming a miscible mixture with methanol at a temperature not greater than about 48° C., where said miscible mixture contains 4 volumes of methanol for each volume of hydrocarbon solvent, separating said insoluble impurities, adding water to said mixture to insolubilize said ketone solvent, resulting in its separation from said hydrocarbon solvent and recovering the hesperetin from the residual aqueous ketone mixture.

10. The process of claim 9 wherein the residual aqueous ketone mixture is further treated by adding sufficient water to partially precipitate pure hesperetin, removing the precipitated hesperetin, distilling the second solvent residue to recover solvent, and finally recovering hesperetin of intermediate purity from the resulting distillation residue.

11. The process of claim 9 wherein the residual aqueous ketone mixture is further treated by adding sufficient water to substantially completely precipitate the hesperetin, removing the precipitated hesperetin, and finally recovering said solvent by distilling the second solvent residue.

12. The process of claim 9 wherein the residual aqueous ketone solution is further treated by distilling to recover the said solvent and recovering relatively pure hesperetin from the distillation residue.

13. A process for purifying crude aglycones of glycosides selected from the group consisting of flavone glycosides and flavanone glycosides which comprises dissolving said aglycone and precipitating the impurities therein in a miscible solvent mixture comprising (1) about 80 to 50% of a solvent selected from the group consisting of water soluble lower alkanones and mixtures thereof with up to about 60% by volume of a water soluble lower alkanol and (2) about 20 to 50% of a solvent selected from the group consisting of non aromatic hydrocarbons and mixtures thereof, said hydrocarbon solvent being characterized by being capable of forming a miscible mixture with methanol at a temperature not greater than about 48° C. where the miscible mixture contains 4 volumes of methanol for each volume of hydrocarbon solvent, separating said insoluble impurities and recovering the aglycone from the solvent mixture.

References Cited in the file of this patent

UNITED STATES PATENTS

| | | |
|---|---|---|
| 1,887,232 | Coleman | Nov. 8, 1932 |
| 1,919,002 | Whitehead | July 18, 1933 |
| 2,348,215 | Highby | May 9, 1944 |
| 2,681,907 | Wender | June 22, 1954 |

OTHER REFERENCES

Wester: Rec. trav. chim., vol. 40, pp. 714–715 (1921).

Weissberger: Technique of Org. Chem., vol. III, pp. 410–413, Interscience (1950).